Dec. 11, 1934.    V. E. CORNELL    1,984,300
APPARATUS FOR WELDING CYLINDRICAL BODIES
Original Filed March 25, 1931    6 Sheets-Sheet 1

Dec. 11, 1934. V. E. CORNELL 1,984,300
APPARATUS FOR WELDING CYLINDRICAL BODIES
Original Filed March 25, 1931 6 Sheets-Sheet 3

Inventor
Vernon E Cornell
By Arthur H. Van Horn
His Attorney

Dec. 11, 1934.   V. E. CORNELL   1,984,300
APPARATUS FOR WELDING CYLINDRICAL BODIES
Original Filed March 25, 1931   6 Sheets-Sheet 4

Dec. 11, 1934.  V. E. CORNELL  1,984,300
APPARATUS FOR WELDING CYLINDRICAL BODIES
Original Filed March 25, 1931   6 Sheets-Sheet 6

Inventor
Vernon E Cornell
By Arthur H. Van Horn
His Attorney

Patented Dec. 11, 1934

1,984,300

UNITED STATES PATENT OFFICE 1,984,300

APPARATUS FOR WELDING CYLINDRICAL BODIES

Vernon E. Cornell, Cleveland, Ohio, assignor to Cornell Securities Corporation, Cleveland, Ohio, a corporation of Delaware Application March 25, 1931, Serial No. 525,154
Renewed March 7, 1934

6 Claims. (Cl. 78—87)

My invention relates to a method and apparatus for welding sheet metal and relates more particularly to such methods and apparatus for continuous automatic or semi-automatic operation for welding longitudinal seams in tubular bodies.

Tubular bodies formed of sheet metal have been welded heretofore by various methods and apparatus, and I have found that in welding longitudinal seams i. e., either lap or butt welded seams, in tubular bodies particularly metal container shells, cans or the like, considerable difficulty has been experienced in properly aligning the lapped or abutting edges along the seam or line of weld and maintaining the edges in proper position under the welding flame or arc at the point of weld. Such difficulties usually are traceable to the intense heat of the welding medium and to improper application or distribution of pressures exerted on the shell. It has been found that high temperatures, if not properly controlled and dissipated will cause the lapping or abutting edges of the shell to spread apart at the point of weld in such a manner that external means must be employed to contract the shell to force the edges of the seam together as the shell progresses toward the point of weld. One form of such means heretofore used includes rollers engaging the major portion of the circumferential walls of the tubular body at several points around the body as it passes through the welding apparatus to contract the shell thereby forcing the adjacent edges of the seam together.

Another form of which I am aware consists in applying inward radial pressures throughout the tubular body or shell by means of clamps or straps, or in passing the shell through a tubular closing member to contract the shell and thereby bring the adjacent edges of the seam together at the point of weld.

All of these devices or apparatus are necessarily complicated in their nature and do not economically contribute to rapid, continuous automatic welding of tubular bodies or shells along their longitudinal seams. Furthermore, such apparatus is bulky and expensive and does not permit of a high degree of accessibility to or control of the welding medium in the operation of the same.

By means of my invention, however, these and other difficulties have been removed, and it is therefore an object of my invention to provide a method and apparatus for automatically welding longitudinal seams in tubular bodies by passing the bodies continuously in end to end relation across the effective path of the welding medium and simultaneously properly aligning or positioning the adjacent edges of the seam to be welded in abutting relation as such edges approach the effective radius of the welding medium.

It is a further object of this invention to weld tubular bodies such as sheet metal shells formed by rolling a sheet of metal into a limited spiral cross section to place the shell normally in a contracted condition, and by continuously and automatically feeding the shells across the effective path of a welding medium while simultaneously and progressively bringing the adjacent edges of the seams together in abutting relation as they approach the welding medium.

Another object of the invention is to increase the rate of production of longitudinally welded shells and at the same time materially reduce the cost of manufacture of the same.

A still further object of my invention is to progressively close the longitudinal seams in tubular bodies as the edges of the seam approach the effective radius of the welding medium, by the application of pressure progressively at a plurality of points along the walls of the shell and in a path adjacent the edges to be welded.

Another object of my invention resides in full automatic control of the apparatus regardless of variations in gauge or quality of stock to be welded.

Another object of my invention is an improved method for continuous automatic welding of tubular bodies.

Other objects and advantages of my invention will become more apparent from the following description of one embodiment thereof, reference being made to the accompanying drawings in which like reference characters are employed to designate like parts throughout the same.

My invention contemplates an automatic continuous method and apparatus for welding tubular bodies along a longitudinal seam, wherein the necessity of exerting radial pressures around the body remote from the seam to close the seam, is eliminated. In other words, in apparatus and methods used heretofore it has been necessary to exert such lateral or radial pressures through the medium of pressure rolls engaging the circumferential wall of the body at the sides and bottom of the shell with respect to the seam. Such closing forces also have been applied by passing the tubular body or shell through a closing member or by clamping bands about the shell. The present invention greatly simplifies the welding of longitudinal seams in metallic shells and at the same time greatly enhances the rate of production of such articles. Furthermore, by my invention continuous automatic welding of successive shells is accomplished and, so far as I am aware, is broadly new. The following description of the embodiment illustrated in the drawings is therefore not to be considered as limiting the present invention in any sense since the invention is capable of many other embodiments and modifications, the form shown here being merely by way of illustration.

The form of my invention illustrated in the accompanying drawings is designed particularly for use in welding metallic shells along a longitudinal seam wherein the edges of the shell defining the seam are brought together to be welded in the form of what is known as a butt weld. That is, the material of the edges is caused to lie in substantially the same plane or arc as distinguished from a lap weld where the edges are overlapped. It is to be understood, however, that my invention may be used for continuously and automatically lap welding metallic shells, if desired.

The following description of my invention is directed particularly to that form of welding known as butt welding.

Figure 1:
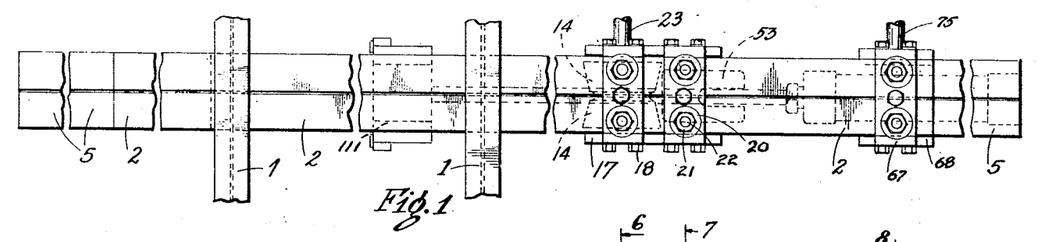
Figure 1 is a top plan view of one embodiment of my invention showing the automatic shell feeding mechanism, but not showing the driving mechanism.
Figure 2:
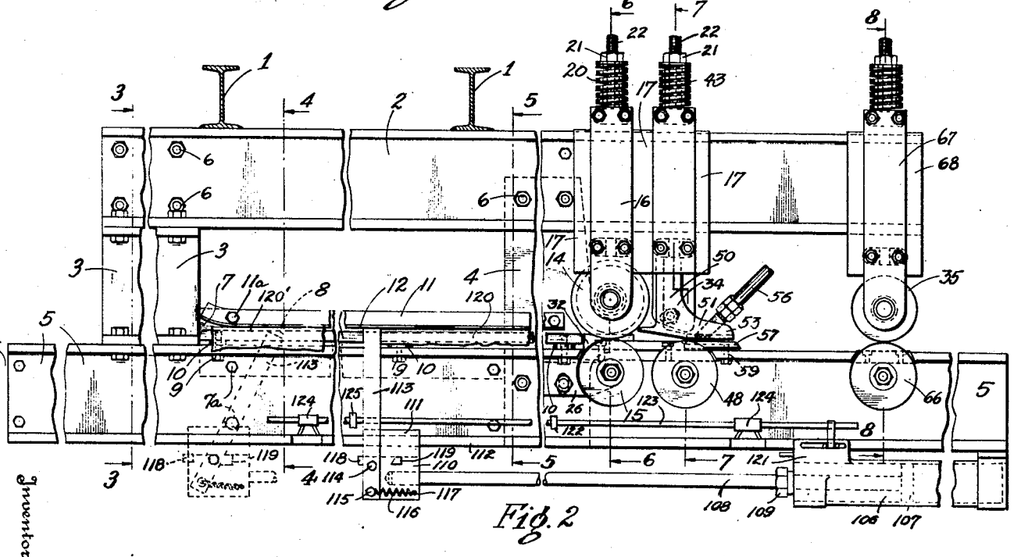
Figure 2 is a side elevation of the apparatus shown in Figure 1.
Figures 16, 17:
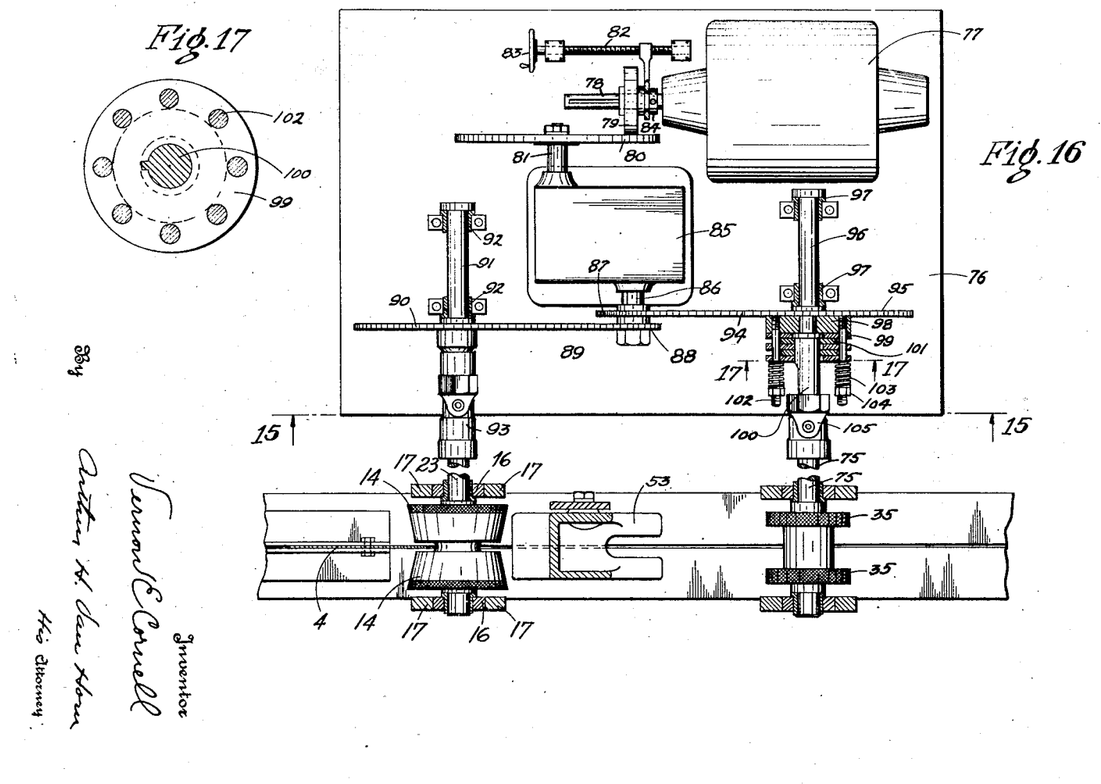
Figure 16 is a top plan view of the driving mechanism with the cover removed and shows the same connected in driving relation to the driven rolls.
Figure 17 is an enlarged section on line 17—17 of Figure 16.

Referring first to Figures 1, 2 and 16, I will proceed to describe the general assembly of the embodiment illustrated. The apparatus is preferably suspended from an inverted V-type frame by means of cross beams 1, although other forms of support may be employed. The frame of the apparatus may be described as comprising essentially a pair of substantially parallel upper and lower beam members, the upper member consisting of an I-beam-like structure 2. Suspended from the beam 2 by means of the spacer beam 3 and the plate 4 is a lower work supporting beam 5. The beam 5 preferably is also I-shaped in cross section and its ends extend beyond the respective ends of the beam 2. A convenient way of constructing the frame resides in using channel irons backed up and secured together throughout, the suspending member 4 extending between the channels of each of the respective beams 2 and 5 as illustrated in the drawings. The channels and plates may be held securely in place by means of bolts 6 and are also preferably welded throughout to make an extremely rigid assembly. Such rigid construction materially aids in maintaining proper alignment of the work as it passes through the apparatus. The plate 4 not only connects the upper and lower frame beams but serves other useful purposes which will become more apparent hereinafter.

In carrying out my invention the normally contracted rolled shell blanks are spread apart and slipped endwise over the horn or left hand end of the supporting beam 5 and are supported on the plates 8 only along the portions in the vicinity of their longitudinal edges (Figures 1 and 2). As the shells are passed to the right the separated walls defining the seam pass on opposite sides of the beam 3 and a separator plate 7 centrally located between the channels forming the beam 5. The plate 7 is secured in place by the bolts 7a.

Figures 3, 4:
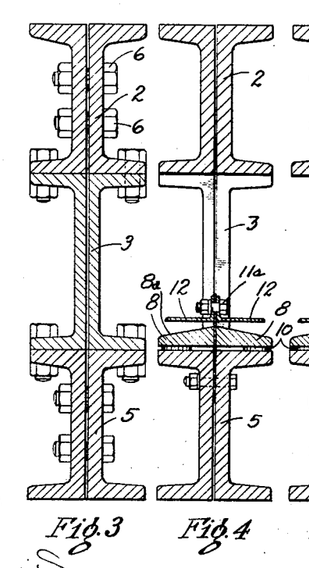
Figure 3 is a vertical section taken on line 3—3 of Figure 2.
Figure 4 is a vertical section taken on line 4—4 of Figure 2.

Shell supporting plates or tracks 8 are carried by the beam 5 on opposite sides of the plate 7 and may be secured to the beam by means of bolts 9. Spacers 10 of desired thickness may be inserted between the plates 8 and the beam channels to support the shell seam walls in proper relation for feeding to the driving rolls. For instance, the plates 8 may be set higher above the beam for shells of thinner gauge stock whereas the plates may be lowered by substituting thinner spacers for use with shells of heavier gauge stock. It will be noted that the shell supporting surfaces of the plates 8 are inclined as illustrated in Figure 4 at 8a to properly accommodate the curved walls of the shell adjacent the seam.

A pair of guide rails 11 having laterally extending flanges or shoes 12 are secured to the plate 7 by means of bolts 11a. It will be seen that in passing a shell between the spaced plates 8 and the flanges or shoes 12, the walls defining the seam are maintained separated but are protected against vertical movement with respect to these parts, the normal tendency of the shell to contract being sufficient to cause the edges of the seam to engage the sides of the plate 7 as the shell travels along the track or support.

Referring now more particularly to Figures 2, 6 to 12 inclusive and 16, it will be seen that I provide means for gripping and driving the shells as they pass along and over the supporting plates 8, and means progressively exerting pressures radially and inwardly of the shell along the seam to press the edges downwardly as the shell is propelled to the right in Figure 2. I have discovered that the application of downward pressures in the vicinity of the seam and at a plurality of points therealong to press the shell seam edges downwardly, results in a marked tendency of the edges of the seam to creep toward each other and close the seam. Since the edges of the seam are thus brought together in abutting relation the conditions under which the seam may be butt-welded are indeed very favorable. Under such conditions the rate of welding is materially increased over former methods, while at the same time producing a more uniform weld throughout the length of the shell.

Figures 5, 6, 7:
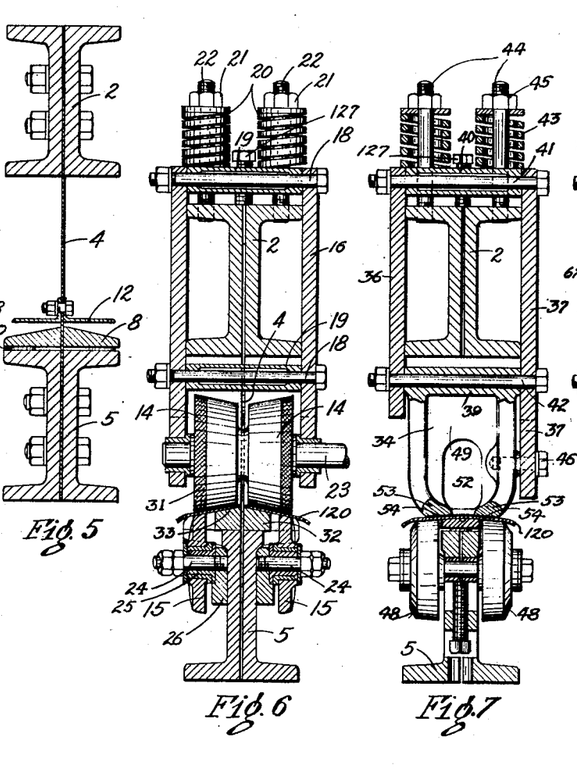
Figure 5 is a vertical section taken on line 5—5 of Figure 2.
Figure 6 is a vertical section taken on line 6—6 of Figure 2.
Figure 7 is a vertical section taken on line 7—7 of Figure 2.
Figure 8:
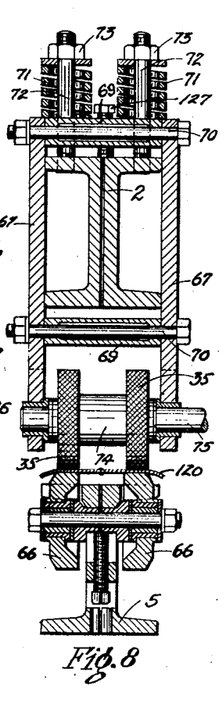
Figure 8 is a vertical section taken on line 8—8 of Figure 2.
Figure 9:
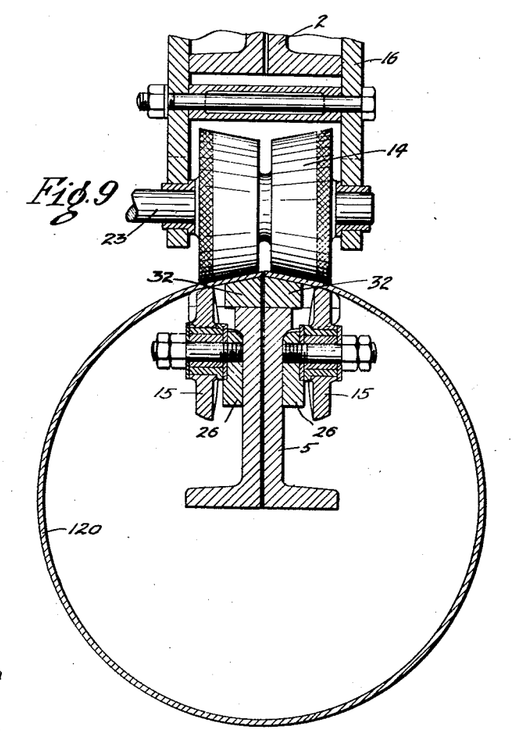
Figure 9 is an enlarged fragmentary section through the driving roller assembly, some of the parts being shown in elevation. In this view I have shown the shell in driven relation to the drive rolls.
Figure 10:
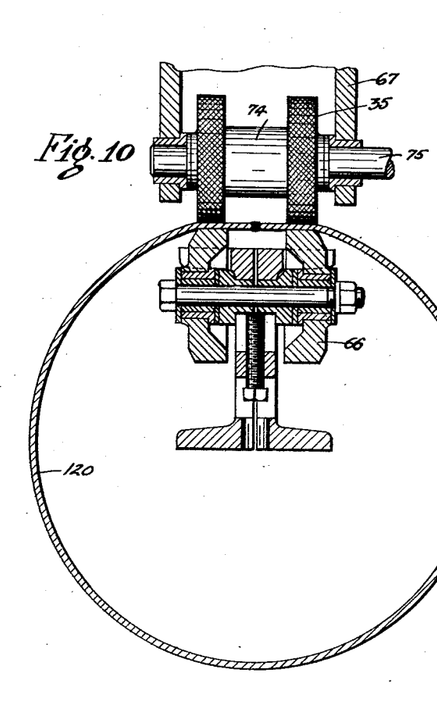
Figure 10 is an enlarged fragmentary section through another set of driving rolls and shows the welded shell being passed therebetween. This view corresponds to that of Figure 8.

The gripping and driving means above referred to may be understood first generally by referring to Figures 2 and 16 in which the initial driving or propelling rolls are indicated at 14 and 15, the lower rolls 15 being preferably idler rolls. The upper rolls 14 are keyed to a shaft 23 rotatably mounted in suitable bearings in the supports 16 slidably operating in the guides 17. The roll supports 16 operate on opposite sides of the beam 2 and are anchored together by means of bolts 18 and the spacers 19 (Figure 6) so that the whole roll assembly is slidable in the guide 17 as a unit. Downward pressure may be exerted on the rolls 14 by the compression springs 20. The compression of these springs is, of course, adjustable through the nuts 21 operating on the pins 22 carried by the beam 2. The rolls 14 are keyed to the shaft 23 which extends laterally of the apparatus and which, in Figure 16, is connected with a source of driving power through suitable mechanism hereinafter described. The lower rolls 15 are rotatably mounted on stub shafts 24 operating in suitable bearings 25 (Figure 6). It will be noted that the rolls 15 are toed-in toward the right in Figures 2 and 9 and in this respect oppose any tendency of outward displacement of the edges of the shell as the shell passes thereover.

Each of the lower rolls 15 and its mounting is preferably individually adjustable with respect to the rolls 14 so that the shell material passing between the rolls may be gripped with substantially equal effect between the respective rolls. When the gripping pressures are thus properly distributed between the respective rolls by proper adjustment thereof, slippage may readily be overcome.

Figure 11:
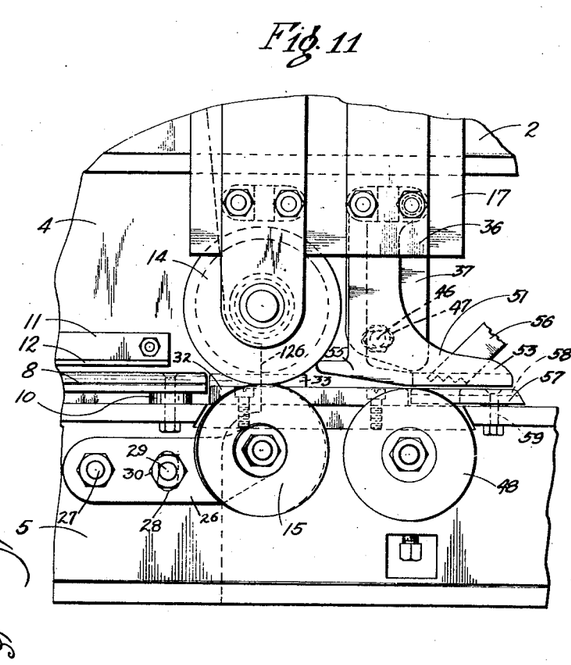
Figure 11 is a fragmentary view in side elevation and slightly enlarged showing a portion of the structure shown in Figure 2. This view shows the relative positions of the parts when a shell is passed between the driving rolls and the pressure shoe.

In Figures 2 and 11 I have illustrated one simple manner of individually adjusting the lower rolls 15. The stub shafts 24 are carried by plates 26 pivotally mounted on the web of the beam 5 as at 27 and these plates are provided with arcuate slots 28 through which the respective bolts 29 project. Nuts 30 are threaded on the bolts 29 to lock the plates in adjusted position. It will be noted that the peripheries of the rolls 15 are knurled or roughened and are inclined to register with the inclined shell engaging walls of the rolls 14. The rolls 14 are also knurled or roughened as at 31. In this manner traction between the rolls and the shell material is improved. It will be noted that the rolls 14 are preferably formed integral with a center web portion and their shell engaging surfaces are inclined inwardly toward the axis of the shaft as indicated in Figure 6.

Plates 32 having inclined shell supporting walls 33 are removably secured to the beam 5 and are adapted to support the shell material as it passes under the rolls 14, there being portions of the plates cut away to permit the rolls 15 to project therethrough.

Referring now more particularly to Figures 2, 7, 11 and 12, I will proceed to describe another important part of my invention. After the shell is delivered to the rolls 14 and 15, it is propelled to the right in Figure 2 beneath a pressure shoe indicated generally at 34. This pressure shoe is located at a point intermediate the rolls 14 and 35 and is adjustably mounted on supporting members 36 and 37 slidably mounted in the guide plates 17.

The parts 36 and 37 are secured together in spaced relation by means of spacers 39 and 40 and the bolts 41 and 42, the entire assembly being slidable as a unit in the guide plates 17 under the compression of springs 43 carried on the pins 44. The compression of these springs may be adjusted by operating the nuts 45. The pressure shoe is substantially L-shaped in side elevation and is preferably integrally formed with the spacer 39 as shown more clearly in Figure 7. When the proper working position of the shoe is determined this position may be maintained by tightening the bolt 46 operating in the depending portion of the support 37, and the bolts 42. It will be noted that the bolt 46 passes through an elongated opening 47 in the depending portion of this support and is threaded in one side of the pressure foot 34. The elongated opening 47 and the slightly enlarged openings in the spacers 39 permit an adjustment of the shoe about the bolts 42 within definite limits. It will be noted that the compression of the spring 43 exerts a downward pressure through the shoe and firmly engages it with the shell material along the edges defining the seam. In this way the abutting edges of the seam are held in proper welding position as they pass beneath the pressure shoe and over the bottom rolls 48.

Figure 12:
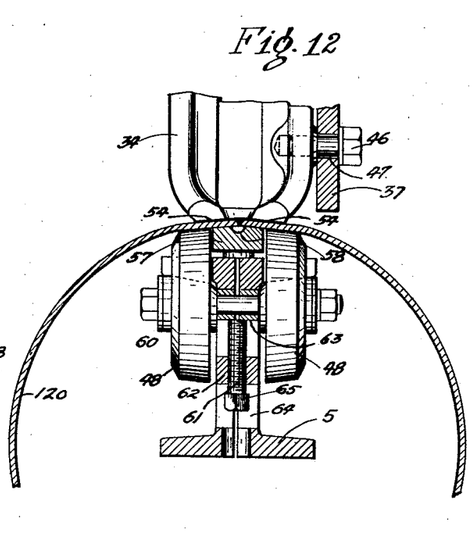
Figure 12 is an enlarged fragmentary section similar to that shown in Figure 7 and shows the shell in place under the pressure shoe.

The pressure shoe is designed for great strength and for rapid dissipation of heat in the immediate vicinity of the shoe and the shell material passing thereunder. The shoe is preferably formed integrally throughout and comprises an upwardly extending portion 49 having side walls 50 which extend downwardly and forwardly as at 51 in Figure 2. The shoe is substantially hollow or shell-like in construction having an opening 52 in its rear wall, the side walls terminating in two forwardly extending feet 53, illustrated more clearly in Figures 7 and 12. The feet are spaced as indicated and their bottom faces are preferably bevelled slightly as at 54 so as to converge inwardly toward the axis of the shoe. The shoe extends rearwardly in a portion 55 which not only acts as a guide for the shell as it passes therebeneath, but also serves as a heat radiating member. The feet 53 are spaced as shown in Figures 7 and 12 to form a welding chamber therebetween, and I have illustrated in Figures 2 and 11 one manner of performing the welding operation in the chamber formed by the feet and the body of the shoe at a point where the side walls of the seam are securely held in abutting relation under very favorable welding conditions. For convenience of illustration I have shown a gas welding torch at 56, although it is to be understood that this invention is not limited to such use since electric welding may be employed to even better advantage. It will be noted that the torch nozzle in proper working position is inserted within the welding chamber between the feet 53 and creates an effective welding area through which the abutting edges of the shell must pass under closing pressure. The feet 53 exert a downward pressure at points along the abutting edges of the shell and on both sides of the welding area as the shell passes between the pressure shoe and the lower rolls 48. An anvil plate 57 having a trough or groove 58 formed therein is removably secured to the beam 5 by means of the bolts 59. The upper surfaces of this plate on opposite sides of the groove are also inclined slightly to conform to the inclination of the bottom walls 54 of the feet 53. As the shell passes beneath the shoe 34 it is supported on this anvil plate and the rolls 48, the trough of the plate being in alignment with the abutting edges defining the seam. The plate 57 may be adjusted vertically of the beam 5 if desired, by inserting shims between the plate and the upper face of the beam. This may be necessary in welding of shells of different gauge material. The supporting rolls 48 are rotatably mounted on a shaft 60 operating in a suitable bearing transversely of the beam 5. The entire roller assembly is adjustable vertically of the beam and is so constructed that the same may readily be disassembled if desired. A screw 61 threaded in a fixed support 62 engages the sleeve 63 supporting the shaft 60 so that by applying a wrench through the opening 64 in the beam 5 to the head 65 of the screw and turning the screw the entire roller assembly may be adjusted vertically of the beam toward or away from the path of the on-coming shell. It is obvious that where shells of heavy gauge are used the rolls 48 may be lowered slightly by this arrangement in order to apply the proper pressures to the shell material.

Another set of driving rolls is provided to grip and propel the welded or partially welded shell as it continues to the right in Figure 2. These rolls are indicated at 35 and 66 in Figure 2, the upper rolls 35 being rotatably mounted in suitable bearings in the supporting plates 67. The plates 67 are likewise slidably mounted in a guide 68 and are secured together in spaced relation to operate in the guides 68. Spacers 69 space the plates 67 and are secured thereto by means of the bolts 70. Compression springs 71 operate on pins 72 carried by the beam 2 and exert their forces of compression downwardly through the supports 67 to the rollers 35. The compression of the springs may be adjusted to any desired degree by adjusting the nuts 73. The rolls 35 are preferably formed integrally as indicated more clearly in Figure 8, there being two shell engaging portions of the rolls 35 connected by a hub-like portion 74. A shaft 75 extends outwardly through bearings in one of the plates 67 and is connected to a source of power through any suitable driving mechanism.

Figure 15:
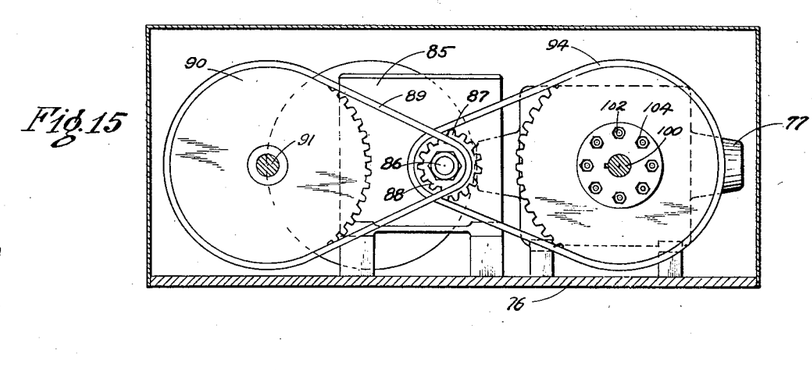
Figure 15 is a section of one form of power drive taken on line 15—15 of Figure 16 and shows the support and cover in section.

In Figures 15, 16 and 17 I have illustrated one form of driving and transmission mechanism which I find particularly well suited for use in connection with my invention. In these figures the drive support 76 is adjustably supported independently of the frame 1, 2, and 5. On the support 76 is provided a source of power such as an electric motor 77 connected with a suitable source of electrical energy. The shaft 78 of the motor carries a friction driving disc 79 which operates on the friction plate 80 carried to the shaft 81. The disc 79 may be adjusted on the shaft by means of the screw 52 and hand wheel 83 shifting the collar 84 and disc 79 along the shaft 80. Suitable speed reduction mechanism may be used within the housing 85 so that suitable power and driving speed may be imparted to the driven rollers 14 and 35 through the shaft 86 and the sprockets 87 and 88 and other suitable mechanism. A direct drive may be taken from the pinion 88 by means of a chain 89 for driving the sprocket 90 at reduced speed. The sprocket 90 is keyed to a shaft 91 which operates in suitable bearings 92, the shaft having connection through a universal coupling 93 to the shaft 23 for driving the rollers 14.

A drive connection may also be taken from the shaft 86 of the speed reducing device through the sprocket 87 the chain 94 and the sprocket 95. The sprocket 95 is keyed to a shaft 96 which is rotatably mounted in suitable bearings 97. I have found it to be desirable to provide a clutch between the shaft 75 of the rolls 35 and the shaft 96. In this manner a better automatic control of the operation of the driven rolls 14 and 35 may be maintained. This is particularly desirable in welding shells which pass through the apparatus in end to end relation in which the rolls 35 may pick up a shell which has just completely passed under the rollers 14 and continue to propel it progressively to the right in Figure 16 without in any way hindering the progress of a succeeding shell between rollers 14.

I have illustrated in this connection one form of clutch which includes a clutch plate 98 carried by the shaft 96. Clutch discs 99 are carried by the shaft 100 and between these discs are alternated similar discs 101 rotatable with the plate 98. Suitable pins 102 are carried by the plate 98 and in turn carrying compression springs 103. The compression of these springs may be adjusted by means of the nuts 104. In this manner power is transmitted from the shaft 96 to the shaft 100 through the cooperating clutch discs 99 and 101, and a universal coupling 105 to the shaft 75.

Another important feature forming a part of the present invention resides in an automatic shell feeding mechanism.

One form of such mechanism is shown in Figures 1 and 2 and is supported from and operates along the beam 5. In carrying out the same I provide a cylinder 106 which is fixedly carried by the beam 5. A plunger 107 operates within the cylinder and is connected by means of connecting rod 108 operating through the packing 109, to a carriage 110. The carriage is provided with upper inwardly extending flanges 111 which slidably engage the flanges 112 of the beam 5. If desired, suitable rollers may be interposed between the flanges 111 and 112 to eliminate friction between these relatively sliding parts. A pair of shell engaging levers 113 are pivotally carried at 114 on the opposite sides of the carriage and extend upwardly on the opposite sides of the beam 5 into the path of movement of a shell on the supporting plates 8. The lower end of each of the levers 113 is provided with a pin 115 to which one end of a tension spring 116 is secured. The other ends of each of the springs 116 are secured to a pin 117 secured to the carriage 110. The carriage is also provided with stops 118 and 119 on each side to limit the movement of the lever in either direction. The springs 116 normally maintain the levers 113 in full line position shown in Figure 2 and against the stops 118. The positions of the parts thus far described in connection with the feeding mechanism, as shown by full lines represents their relative positions when the levers 113 are in engagement with a shell 120 on the plates 8 for pushing the shell to the right in Figure 2 toward the driving rolls 14. When the rolls 14 and 15 grip the shell in driving relation and propel it further to the right in Figure 2 the feeding mechanism including the plunger, the carriage and the levers will also move to the right with the levers 113 in engagement with the lower end of the shell. Fluid under low pressure is communicated to the interior of the cylinder 106 on one side of the plunger through a reversing valve indicated generally at 121. A fluid under pressure is also communicated to the interior of the cylinder 106 on the opposite side of the plunger 107 through the reversing valve 121 thereby providing a double acting plunger for movement of the carriage in either direction along the beam 5.

I have also shown in dotted lines in Figure 2 the relative positions of the parts of the feeding mechanism during movement of the connecting rod and carriage to the left toward a position in which the levers 113 may engage a second shell 120' in pushing relation. As the rear end of the shell 120 approaches the right hand ends of the plates 8 the carriage 110 will engage a stop 122 carried on a trip rod 123 slidable in the bearings 124. As the carriage engages this trip the rod 123 is moved to the right to operate the reversing valve 121 to admit fluid under pressure to the right hand chamber in the cylinder 106, and to release and to open an exhaust port into the same to the left of the plunger in the cylinder 106. As the plunger is moved to the left the levers 113 will engage the forward end of a succeeding shell and will be swung to the position shown in dotted lines in Figure 2 permitting the levers to slide along in engagement with the inner wall of the shell and against the tension of the springs 116. While in this position the levers approach the stops 119. As the levers pass free of the rear end of the succeeding shell they again assume the full line position. As the carriage 110 moves to the left and engages the stop 125 on the rod 123, the rod is shifted to the left to again operate the reversing valve to admit fluid under pressure to the left hand chamber of the cylinder 106 and to open an exhaust port in the right hand chamber on the opposite side of the plunger. Thus it will be seen that the operation of the feeding mechanism may be carried out automatically and continuously as long as fluid under relatively low pressure is supplied to the cylinder. I have found that the mechanism may be effectively and economically operated at low pressures since very little power is required to slide the shells along the plates 8 into engagement with the driving rolls 14 and 15.

After these rolls take up the drive the carriage will continue in its movement to the right until the stop 122 is engaged to reverse the action of the plunger 107. As the first shell approaches the right ends of the plates 8 the operator may place one or more succeeding shells on the left hand ends of the plates so that upon completion of the travel of the carriage 110 to the right, succeeding shells will be in position to be engaged by the levers 113 and in turn propelled toward the rollers 14 and 15.

The operation of the embodiment of my invention illustrated in the accompanying drawings may be described as follows:

Assuming that the driving mechanism has been adjusted to deliver the driving power and is connected to the driven shafts 23 and 75 and that the motor 77 is started, the propelling rolls 14 and 35 will be rotated to grip and propel the shells as they are fed to these rolls. A normally contracted shell is first spread to separate the longitudinal edges defining the seam to be welded, and is slipped over the left hand end or horn of the beam 5, Figure 2, the shell being supported only along portions in the vicinity of the longitudinal edges, on the plates 8 on opposite sides of the plate 7. The first shell is pushed along the plates 8 by means of the levers 113 when fluid under relatively low pressure is admitted to the left hand chamber of the cylinder 106, the shell material passes between the plates 8 and the guide flanges 12 until its forward end engages the rolls 14. The forward end of the shell adjacent the longitudinal edges passes between the rolls 14 and 15 and over the plates 32 on opposite sides of the guide plate 4. It will be noted that the forward edge 126 of the guide plate lies in a plane defined by a straight line passing through the centers of these rolls.

A desired pressure may be exerted through the rolls 14 upon the shell 120 by adjusting the springs 20, and, if it is found that either one or both of the lower rolls 15 must be adjusted relatively toward or away from the rolls 14 this may be accomplished by merely shifting the plates 26 in the proper direction on the beam and tightening the nuts 30. After both rolls 15 have been properly adjusted with respect to the rolls 14 so as to prevent slippage of the shell as it passes between these rolls, the forward end of the shell passes under the heel or inclined rearward portion 55 of the shoe 51. The shell material in the vicinity of the longitudinal edges thereof is therefore progressively pressed downwardly toward the plate 57 and the feet 53 of the shoe between which they are propelled. The pressure exerted through the shoe 51 may be predetermined by adjusting the compression of the springs 43 and also by adjusting the lower rolls 48. As the shell material along the longitudinal edges thereof passes over the rolls 48 and between the plate 57 and the feet 53, downward pressure is applied first at the edges defining the seam and then gradually outwardly over the area supported by the rolls 48 and the plate 57. The application of this pressure in such a manner has the peculiar property of causing the opposite longitudinal edges of the shell to creep toward each other so as to close the seam and bring the opposite edges thereof in close abutting relation at a point beginning substantially at the rear extremities of the feet 53 which may be defined as the junction between the horizontal bottom walls of the feet and the inclined wall of the heel 55. Thus it will be seen that as the abutting edges of the seam pass along between the feet 53 they will pass through an area defined hereinbefore as the effective welding area or chamber.

Since the edges of the seam are now in abutting relation as they pass through this chamber, the welding flame or arc may be very efficiently applied to this point. I have indicated in Figures 2 and 11 an application of welding temperatures through a torch 56 although it is to be understood that an electric welding unit may be equally well applied. In view of the particular construction of the shoe 51 the intense heat created in the welding chamber may be dissipated easily. I have found that if this intense heat is not properly dissipated but is transmitted to the oncoming portions of the shell, particularly those portions as they pass under the heel 55, there will be a tendency to repel the closing of the adjacent edges of the seam as they pass between the anvil 57 and the bottom wall of the shoe 51. With this heat properly dissipated, however, this difficulty is easily overcome so that as the spaced edges of the shell are fed toward the welding chamber they may be readily brought into close abutting relation without interference.

Figures 13, 14:
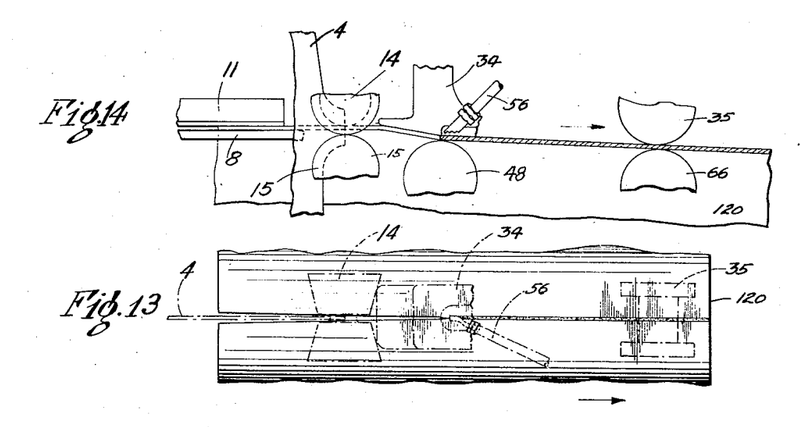
Figure 13 is a top plan view of a shell partially welded in accordance with my invention and illustrates the progressive condition of the seam as the shell passes through the apparatus. The driving rolls and the pressure shoe are shown in diagrammatic form in dotted lines.
Figure 14 is a longitudinal section taken on line 14—14 of Figure 13.

It will be noted that as the welded portion of the shell passes beyond the anvil plate 57 and on between the driven rollers 35 and the rollers 66, it is deflected slightly downwardly, since the rolls 35 and 66 are adjusted to cause this slight deflection. This is illustrated diagrammatically in Figure 14. By applying downward pressure through the rolls 35 and radially of the shell and causing the shell material to be thus deflected over the forward end of the anvil plate 57, the resultant forces or stresses set up in the shell throughout the welded portion thereof creates an even greater tendency for the remaining free longitudinal edges to creep together in contactual relation. This is particularly true in respect to that portion of the shell extending in Figure 2 from the welding area between the feet 53 to the left hand end of the shell.

In this manner the problem of making a continuously uniform weld throughout the seam of the shell is easily solved, since in the presence of downward radial pressure at a point to the right of the effective welding area, the remaining portions of the seam extending to the rear end of the shell are very effectively handled to permit a uniformly welded seam to extend from one end of the shell to the other.

As the welded portion of the shell passes between the rollers 35 and 66 it is propelled by these rollers to the right until it is discharged over the end of the beam 5 into a suitable conveyor, or the like.

If desired a shoe (not shown) may be adjustably supported from the beam 2 between the shoe 51 and the rollers 35. In this event the shoe will be constructed in a manner similar to that indicated at 51 and will engage the inclined wall of the shell as it passes from the anvil plate 57 to the right in Figure 2. The inclined under surface of the heel portion of the secondary shoe may be disposed at an angle defined by the inclined portion of the shell as it passes thereunder, the bottom walls of the feet of the shoe lying in a plane substantially parallel to the upper surface of the beam 5. When downward pressure is applied through this shoe to the welded portion of the shell as it passes thereunder, it will set up resultant forces or stresses in the shell which will act in a manner similar to those set up by the pressures exerted through the rolls 35.

It will be seen from the above description of my invention that tubular bodies may be welded longitudinally in a quick, efficient and automatic manner and that a uniform weld may be made along the longitudinal seam throughout the length of the weld. Furthermore, it will be noted that by the use of this invention the shell is supported along limited areas adjacent the longitudinal seam and that it is unnecessary to support the shell in any other manner.

It may be desired to remove a shell during its course of movement under the rolls 14, the shoe 51 and the rolls 35. I have provided means whereby these members may be individually lifted from engagement with the shell walls. Such means is illustrated as including the screws 127 each operating in the upper spacers 19, 40 and 69 respectively, and against the beam 5 as shown clearly in Figures 6, 7 and 8. A wrench may be applied to turn the screws in a direction that will cause the respective roller and shoe supporting means to be lifted from the shell. The shell may be grasped by the operator and expanded sufficiently, if not yet welded, to remove it downwardly of the beam 5. If the shell is partially welded it may be slipped endwise to the right in Figure 2 and easily be removed from the discharge end of the beam 5.

Various changes may be made in the details of construction and arrangement of parts without departing from the spirit of my invention or the scope of the appended claims.

I claim:

1. In an apparatus for welding longitudinal seams in metallic shells, an elongated support for the shells, means for propelling the shells along the support including driven rollers, for gripping the shell material adjacent the longitudinal edges thereof and propelling the shell along the support, and supplemental driven propelling rollers for discharging said shells from the support, a shoe intermediate said spaced driven rollers to exert a pressure radially first against the edges defining the seam and then progressively circumferentially of the shell whereby the edges of the seam are caused to creep together in contacted relation said shoe comprising a substantially L-shaped hollow member, the base of the shoe terminating at one end in a pair of spaced pressure feet and terminating rearwardly in an inclined heel portion for engaging the shell along the longitudinal edges, and means to fuse the contacted edges.

2. In an apparatus for welding longitudinal seams in metallic shells, an elongated support for the shells, means for propelling the shells along the support including driven rollers for gripping the shell material adjacent the longitudinal edges thereof and propelling the shell along the support, and supplemental driven propelling rollers for discharging said shells from the support, a shoe intermediate said spaced driven rollers to exert a pressure radially first against the edges defining the seam and then progressively circumferentially of the shell whereby the edges of the seam are caused to creep together in contacted relation, said shoe comprising a substantially L-shaped hollow member, the base of the shoe terminating at one end in a pair of spaced pressure feet and terminating rearwardly in an inclined heel portion for engaging the shell along the longitudinal edges, and means for welding the contacting edges of the seam, said welding means being located in close proximity to said shoe.

3. In an apparatus for welding longitudinal seams in metallic shells, an elongated support for the shells, means for propelling the shells along the support including driven rollers for gripping the shell material adjacent the longitudinal edges thereof and propelling the shell along the support, and supplemental driven propelling rollers for discharging said shells from the support, a shoe intermediate said spaced driven rollers to exert a pressure radially first against the edges defining the seam and then progressively circumferentially of the shell whereby the edges of the seam are caused to creep together in contacted relation, said shoe comprising a substantially L-shaped hollow member the base terminating at one end in a pair of spaced pressure feet and terminating rearwardly in an inclined heel portion for engaging the shell along the longitudinal edges, and means for welding the contacting edges of the seam, said welding means creating an effective welding area between the spaced feet of the shoe.

4. In an apparatus for welding longitudinal seams in metallic shells, an elongated support for the shells, means for propelling the shells along the support including driven rollers for gripping the shell material adjacent the longitudinal edges thereof and propelling the shell along the support, and supplemental driven propelling rollers for discharging said shells from the support, a shoe intermediate said spaced driven rollers to exert a pressure radially first against the edges defining the seam and then progressively circumferentially of the shell whereby the edges of the seam are caused to creep together in contacted relation, said shoe comprising a substantially L-shaped hollow member the base terminating at one end in a pair of spaced pressure feet and terminating rearwardly in an inclined heel portion for engaging the shell along the longitudinal edges, and means for welding the contacting edges of the seam, said welding means extending within the hollow shoe and between the feet thereof.

5. In a machine for welding longitudinal seams in drums or the like, a support for the work, means for automatically feeding the drums in end to end relation along the support, driven rollers for propelling the drums across the path of a welding flame, and a shoe engageable with the work along the longitudinal edges defining the seam to exert pressure along said edges radially inwardly of the work and to thereby cause said edges to creep together as they pass through the welding area, said shoe having a rearwardly inclined heel portion whereby said radial pressure may be applied to the edge portions of the work progressively inwardly thereof.

6. An apparatus for continuously welding together the longitudinal edges of split shells including a support for the shells in end to end relation, driving means for propelling the shells along the support, a pressure exerting member, said member having an inclined portion arranged in the path of movement of said shells adjacent the longitudinal edges thereof to bend the same inwardly toward the center of the shells progressively as the shells pass therebeneath, whereby said edges are caused to creep toward each other, and means to fuse said edges while they are in close or abutting relation.

VERNON E. CORNELL.